(12) United States Patent
Small et al.

(10) Patent No.: US 9,880,863 B2
(45) Date of Patent: Jan. 30, 2018

(54) METHODS AND SYSTEMS FOR INCREASING PROCESSOR SPEED BY CREATING RULE ENGINE RULES FROM UNSTRUCTURED TEXT

(71) Applicant: The Boeing Company, Chicago, IL (US)

(72) Inventors: Gregory John Small, Federal Way, WA (US); Goran Stojkovic, Englewood, CO (US); Kent E. Young, Englewood, CO (US)

(73) Assignee: THE BOEING COMPANY, Chicago, IL (US)

( * ) Notice: Subject to any disclaimer, the term of this patent is extended or adjusted under 35 U.S.C. 154(b) by 135 days.

(21) Appl. No.: 14/940,737

(22) Filed: Nov. 13, 2015

(65) Prior Publication Data
US 2017/0139903 A1    May 18, 2017

(51) Int. Cl.
| | |
|---|---|
| *G06F 17/27* | (2006.01) |
| *G06F 17/21* | (2006.01) |
| *G06F 9/445* | (2006.01) |
| *G06F 17/30* | (2006.01) |

(52) U.S. Cl.
CPC ........ *G06F 9/44505* (2013.01); *G06F 17/271* (2013.01); *G06F 17/2785* (2013.01); *G06F 17/30654* (2013.01)

(58) Field of Classification Search
CPC .. G06F 17/27; G06F 17/2765; G06F 17/2785; G06F 17/30654; G06F 17/2705; G06F 17/21; G06F 17/30684; G06F 17/30976; G06F 17/272; G06F 17/30253; G06F 17/30011; G10L 15/1822

USPC ...................................................... 704/9, 10
See application file for complete search history.

(56) References Cited

U.S. PATENT DOCUMENTS

| | | | | | |
|---|---|---|---|---|---|
| 5,016,204 | A | * | 5/1991 | Simoudis ............ | G06F 17/5045 703/14 |
| 5,063,522 | A | * | 11/1991 | Winters ................... | G06N 5/04 706/10 |
| 5,075,881 | A | * | 12/1991 | Blomberg ........... | G06F 17/5009 434/30 |

(Continued)

OTHER PUBLICATIONS

Zhou, Y., Li, Y., & Wang, W. (2011). A feature-based fixture design methodology for the manufacturing of aircraft structural parts. Robotics and Computer-Integrated Manufacturing, 27(6), 986-993.*

(Continued)

*Primary Examiner* — Edgar Guerra-Erazo
(74) *Attorney, Agent, or Firm* — Yee & Associates, P.C.

(57) ABSTRACT

A method of manufacturing an aircraft. A plurality of documents, each comprising corresponding unstructured text and each being from a different source, is received at a processor, a particular document being in the plurality of documents. The particular document is selected by the processor based on a policy. The corresponding unstructured text for the particular document is converted by the processor into a structured language. The structured language is compiled by the processor into rules for a rules engine comprising software stored on a non-transitory computer readable storage medium. The rules for the rules engine are parsed by the processor into a set of rules. The aircraft is constructed according to the set of rules.

20 Claims, 9 Drawing Sheets

(56) References Cited

U.S. PATENT DOCUMENTS

| | | | | |
|---|---|---|---|---|
| 5,228,116 A * | 7/1993 | Harris | ............ | G06N 5/02 |
| | | | | 706/47 |
| 5,333,237 A * | 7/1994 | Stefanopoulos | ......... | G06N 5/04 |
| | | | | 706/11 |
| 5,712,896 A * | 1/1998 | Lee | ............ | H04M 3/08 |
| | | | | 379/14 |
| 6,035,305 A * | 3/2000 | Strevey | ............ | G06Q 10/06 |
| 6,968,298 B2 * | 11/2005 | Lohmann | ............ | G05B 19/409 |
| | | | | 703/1 |
| 8,051,026 B2 | 11/2011 | Zhuk | | |
| 9,015,683 B2 | 4/2015 | Cho et al. | | |
| 9,058,464 B2 * | 6/2015 | Song | ............ | G06F 17/5095 |
| 9,063,673 B2 | 6/2015 | Weigert et al. | | |
| 9,111,071 B2 | 8/2015 | Kerschbaum | | |
| 9,128,906 B2 | 9/2015 | Peters et al. | | |
| 2002/0026296 A1 * | 2/2002 | Lohmann | ............ | G05B 19/409 |
| | | | | 703/1 |
| 2004/0034848 A1 * | 2/2004 | Moore | ............ | G06N 5/047 |
| | | | | 717/117 |
| 2004/0153295 A1 * | 8/2004 | Lohmann | ............ | G05B 19/409 |
| | | | | 703/1 |
| 2015/0339269 A1 * | 11/2015 | Konchitsky | ............ | G06F 17/212 |
| | | | | 715/211 |

OTHER PUBLICATIONS

L. Harrison, P. Saunders, and J. Janowitz, "Artificial Intelligence with Applications for Aircraft.," Technical report, DTIC Document, 1994.*

* cited by examiner

METHODS AND SYSTEMS FOR INCREASING PROCESSOR SPEED BY CREATING RULE ENGINE RULES FROM UNSTRUCTURED TEXT

BACKGROUND INFORMATION

1. Field

The present disclosure relates to systems and methods for creating rules engine rules from unstructured text in order to increase processor speed. More particularly, the present disclosure relates to systems and methods for creating rule engine rules by starting with unstructured text, converting the unstructured text to structured text, and then creating the rules engine rules from the structured text.

2. Background

The current process of creating rules engine rules from regulatory authority and airline text documents is manual and therefore expensive, time consuming, and error-prone. The resulting set of manually generated rules cannot be certified to a regulatory authority. For example, manual auditing is required to validate that regulatory authority rules and union contracts have been properly interpreted into rule engine rules. This process of manually creating union legality rules and auditing may be repeated every time a contract is renegotiated, resulting in significant time and expense. Furthermore, a vast plurality of unstructured text documents may be processed to generate the rules, which compounds the time and expense problem.

SUMMARY

The illustrative embodiments provide for a method for increasing operational speed of a computer system including a processor. The method includes receiving, at the processor, a plurality of documents each comprising corresponding unstructured text and each being from a different source, a particular document being in the plurality of documents. The method also includes selecting, by the processor based on a policy, the particular document. The method also includes converting, by the processor, the corresponding unstructured text for the particular document into a structured language. The method also includes compiling, by the processor, the structured language into rules for a rules engine comprising software stored on a non-transitory computer readable storage medium. The method also includes parsing, by the processor, the rules for the rules engine into a set of rules. The method also includes comparing, by the processor, the set of rules to input comprising a data set which describes a circumstance to which the set of rules will be compared to determine whether the circumstance complies with the set of rules. The method also includes, responsive to the circumstance failing to comply with the set of rules, terminating further processing. The method also includes, responsive to the circumstance complying with the set of rules, selecting a different document in the plurality of documents and repeating selecting, converting, compiling, parsing, and comparing until all available documents are processed, whereby a speed of operation of the processor is increased by limiting information to be processed.

The illustrative embodiments also provide for a method for implementing a physical process. The method includes receiving, at the processor, a plurality of documents each comprising corresponding unstructured text and each being from a different source, a particular document being in the plurality of documents. The method also includes selecting, by the processor based on a policy, one of the plurality of documents. The method also includes converting, by the processor, the corresponding unstructured text for the particular document into a structured language. The method also includes compiling, by the processor, the structured language into rules for a rules engine comprising software stored on a non-transitory computer readable storage medium. The method also includes parsing, by the processor, the rules for the rules engine into a set of rules. The method also includes implementing a physical process according to the set of rules.

The illustrative embodiments also provide for a method of manufacturing an aircraft. The method includes receiving, at the processor, a plurality of documents each comprising corresponding unstructured text and each being from a different source, a particular document being in the plurality of documents. The method also includes selecting, by the processor based on a policy, the particular document. The method also includes converting, by the processor, the corresponding unstructured text for the particular document into a structured language. The method also includes compiling, by the processor, the structured language into rules for a rules engine comprising software stored on a non-transitory computer readable storage medium. The method also includes parsing, by the processor, the rules for the rules engine into a set of rules. The method also includes constructing the aircraft according to the set of rules.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
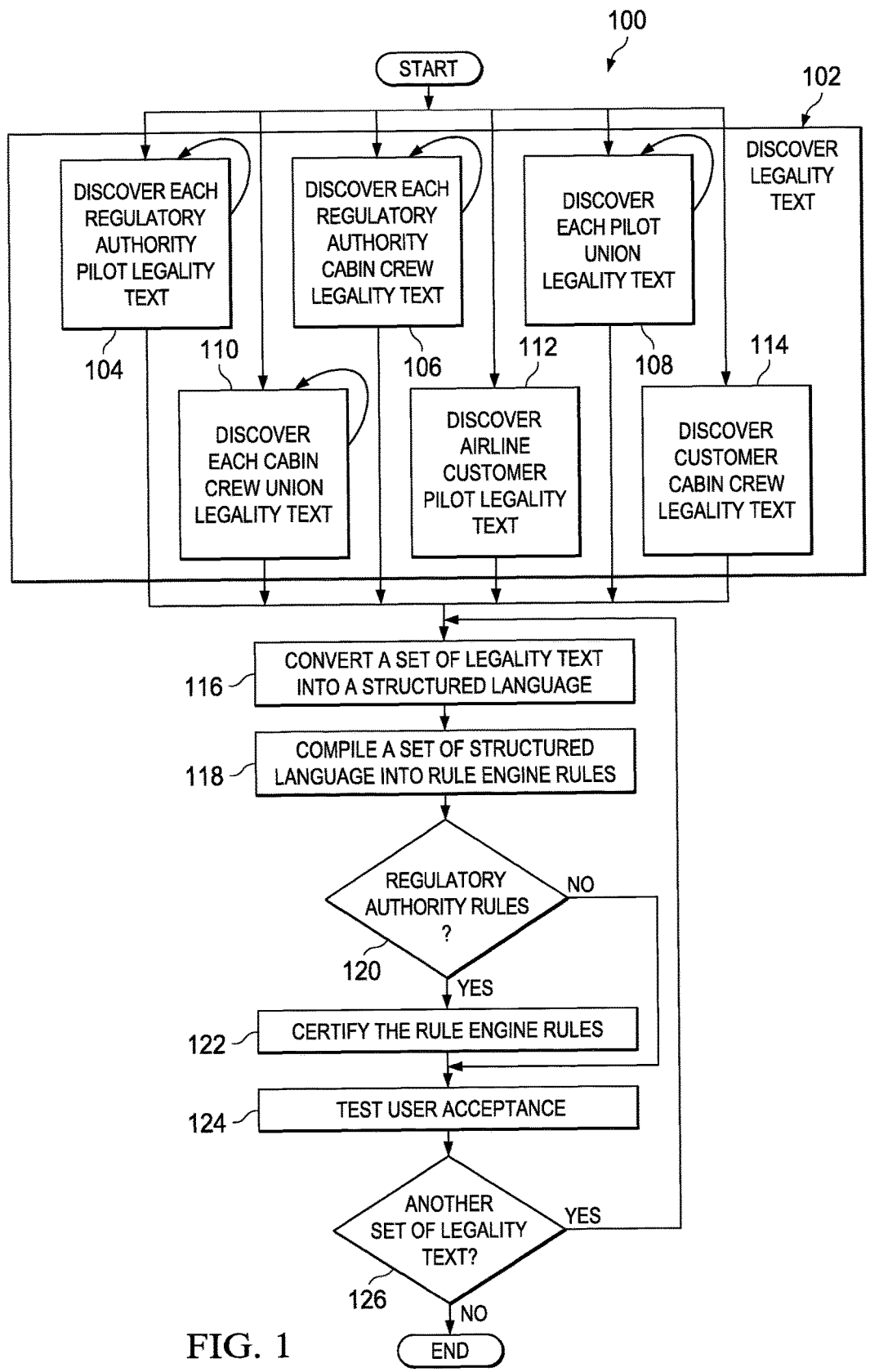
FIG. 1 is a flowchart of a process for discovering, converting, compiling, and certifying rules, in accordance with an illustrative embodiment.

The illustrative embodiments recognize and take into account that, prior to the illustrative embodiments, the process for creating rule engine rules was manual. Thus, for example, the current process of creating rules from regulatory authority and airline text documents is manual and therefore expensive, time consuming, and error-prone. The resulting set of rules cannot be certified to a regulatory authority. Manual auditing is required to validate that regulatory authority rules and union contracts have been properly interpreted into rule engine rules. This process of manually creating union legality rules and auditing is repeated every time a contract is renegotiated. The illustrative embodiments also recognize and take into account that manual rules generation may result in creating faulty pilot and cabin crew legality rules.

The illustrative embodiments also recognize and take into account that there are over twenty global regulatory authorities with different pilot and cabin crew legality rules. For example, the Federal Aviation Administration (FAA) and European operational rules (EU-OPS) regulations are different. Some of the other regulatory authorities adopt FAA rules while others adopt EU OPS rules. Some countries use a combination of FAA and EU OPS legality rules. Some Middle East regulatory authorities have their own crew legality rules that are different from both FAA and EU OPS regulations. In addition, business aviation has different regulatory authority rules than commercial.

Each of these sources of rules may involve a vast amount of text. Because of the vast number of legality rules, an operator or service provider may find it difficult to manually create and keep current all of the rules for all regulatory authorities.

The illustrative embodiments also recognize and take into account that the cost of developing business aviation pilot and cabin crew legality rules may be very high. Due to the cost, effort, and time involved to manually create the large set of regulatory rules, a cost/benefit analysis may be desirable to determine which markets to address and which are not worth the investment. Thus, the illustrative embodiments recognize and take into account that an aircraft operator may choose to avoid certain countries, regions, or markets, simply because of cost of creating and tracking rules to ensure compliance may be too high relative to the value of the market. Yet further, the skill required to create pilot and cabin crew legality rules is rare and expensive, not only driving up costs but also limiting potential markets.

The illustrative embodiments further recognize and take into account that the effects of pilot and cabin crew union contract changes might not be fully understood by the union or the airline operator prior to ratification. During union negotiations the full effect of contract changes to crew legality might not be fully understood by the union or the company. Incorrect or incomplete understandings may lead to overly generous results or unnecessary burdens for one party after the rules are programmed into the rule engine.

The illustrative embodiments further recognize and take into account that rules may be slow to evaluate. Many rules may apply to pilots and cabin crew that must be checked. During disruption recovery a quick evaluation is desirable to uncover all legal solutions.

The illustrative embodiments further recognize and take into account that different pilots and cabin crewmembers may be under different union contracts. Due to mergers and acquisitions for example, two different pilots or two different flight attendants with the same qualifications and experience may be bound by different legality rules. Not properly enforcing the correct contract conditions on the correct individuals may result in grievances by one part or the other and corresponding negative remediation action upon the airline.

Thus, the illustrative embodiments provide for techniques for addressing the above issues. For example, the illustrative embodiments provide for a method and system that creates rule engine language rules that can be directly used by a computing system from unstructured text.

The regulatory authority, union and airline pilot and cabin crew legality rules text may be imprecise. By use of a language converter, such as for a converter for converting text into annotation query language, this imprecise language is repaired. These regulatory authority flight and cabin crew legality rules may be created by any or all of regulatory authorities, company-specific pilot and cabin crew legality policies, and from union contract legality terms and conditions. Potential conflicts among rules may be identified. The resulting sets of rules engine rules may be used directly by a rules engine computing system to establish legality or illegality of a presented pilot or cabin crew condition.

Definitions: The following definitions apply throughout this document:

The term "abstract syntax tree" is a tree representation of an abstract syntactic structure of source code written in a programming language. Each node of the tree denotes a construct occurring in the source code. The syntax is abstract in not representing every detail appearing in the real syntax.

The term "association rules" refers to rules developed in the context of the field of association rule learning, which is a method for discovering relations between variables in large databases, particularly using what is known in the field as "strong rules".

AQL: The term "AQL" is an acronym standing for Annotation Query Language. AQL is a declarative language used for developing text analytics extractors in a text analytics system. While the illustrative embodiments refer to AQL in several specific examples, these examples should be considered non-limiting as other structured languages could be used, such as but not limited to the structured query language (SQL).

The term "cognitive framework" refers to a set of codes which represent a denotative meaning and possible conative meanings for a particular word or concept.

The term "depth first" refers to a depth first search, which is an algorithm for traversing or searching tree or graph data structures. Depth first searching starts at the root of the tree or graph and explores as far as possible along each branch before back tracking.

FAA: The term "FAA" refers to the United States Federal Aviation Administration.

The term "feature classification" is a process of identifying to which of a set of categories a new observation belongs on the basis of a training set of data containing observations whose category membership is known. An example of feature classification is assigning a new email to a spam folder or an inbox.

The term "grammar" is a set of structural rules governing the composition of clauses, phrases, and words in any given natural language.

The term "lexeme" is a unit of lexical meaning that exists regardless of a number of inflectional endings it may have or a number of words it may contain. Thus, a lexeme is a basic unit of meaning. For example, the headwords of a dictionary are lexemes.

The term "metaprogram" is a computer program that has the ability to treat other programs as input data. Thus, a metaprogram could be designed to read, generate, analyze, or transform other programs and even modify itself while running.

The term "semantic relations" refers to a relationships in a semantic network, which is a network representing semantic relations between concepts. A semantic network is a directed or undirected graph including vertices which represent concepts and edges, which connect the concepts.

The term "three address code" or "TAC" or "3AC" is an intermediate code used by optimizing compilers to aid in the implementation of code improving transformations.

The term "token" refers to a structure representing a lexeme that explicitly indicates its categorization for the purpose of parsing. A category of tokens may be called a part of speech. Examples of token categories may include an identifier and an integer literal, though the set of token categories may differ in different programming languages.

The term "unparse" means to regenerate source code from an intermediate representation.

Attention is now turned to the Figures. FIGS. 2 through 5 should be read together.

Figure 2:
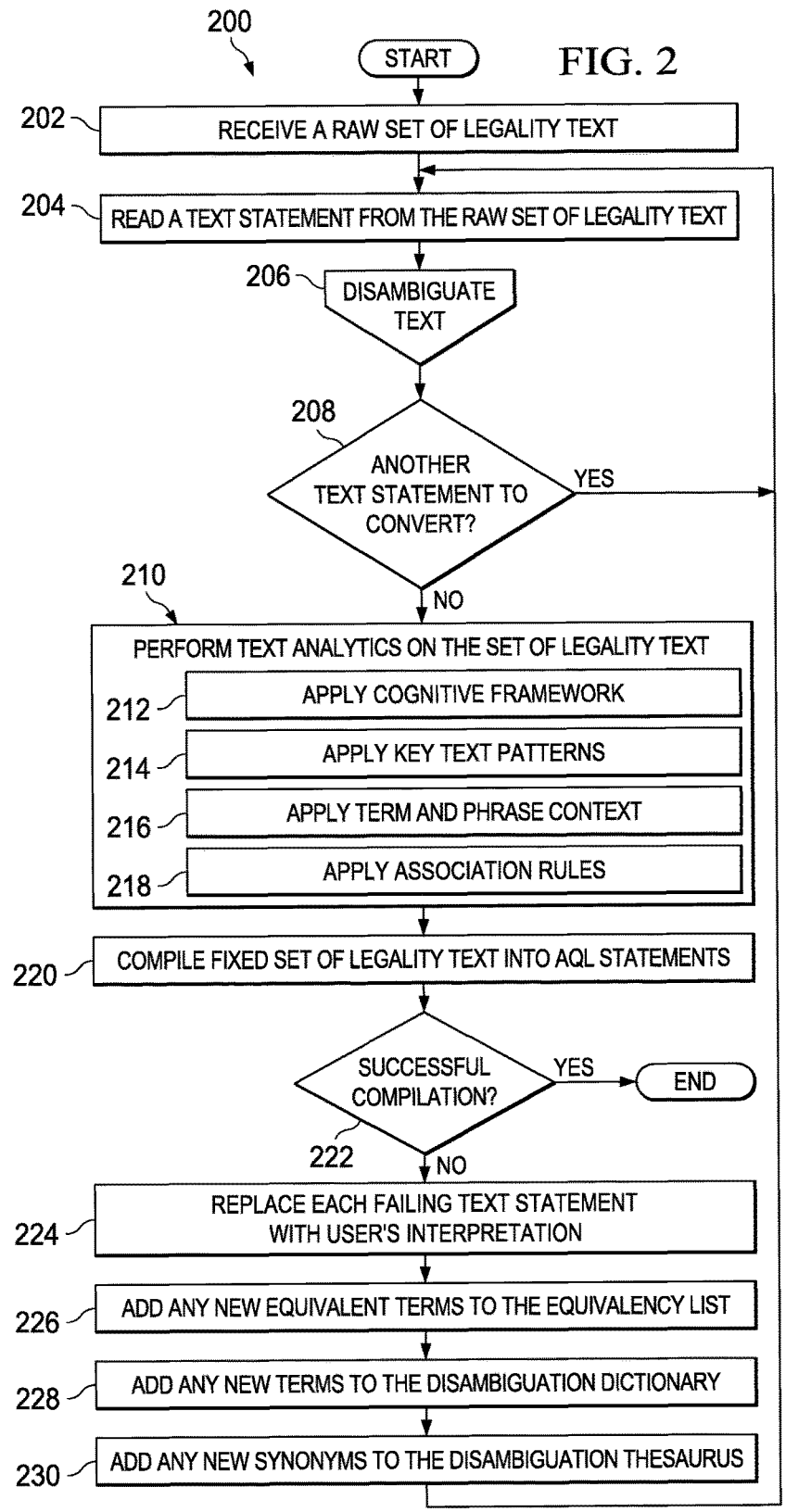
FIG. 2 is a flowchart of a process for converting rules into a structured language, in accordance with an illustrative embodiment.
Figure 3:
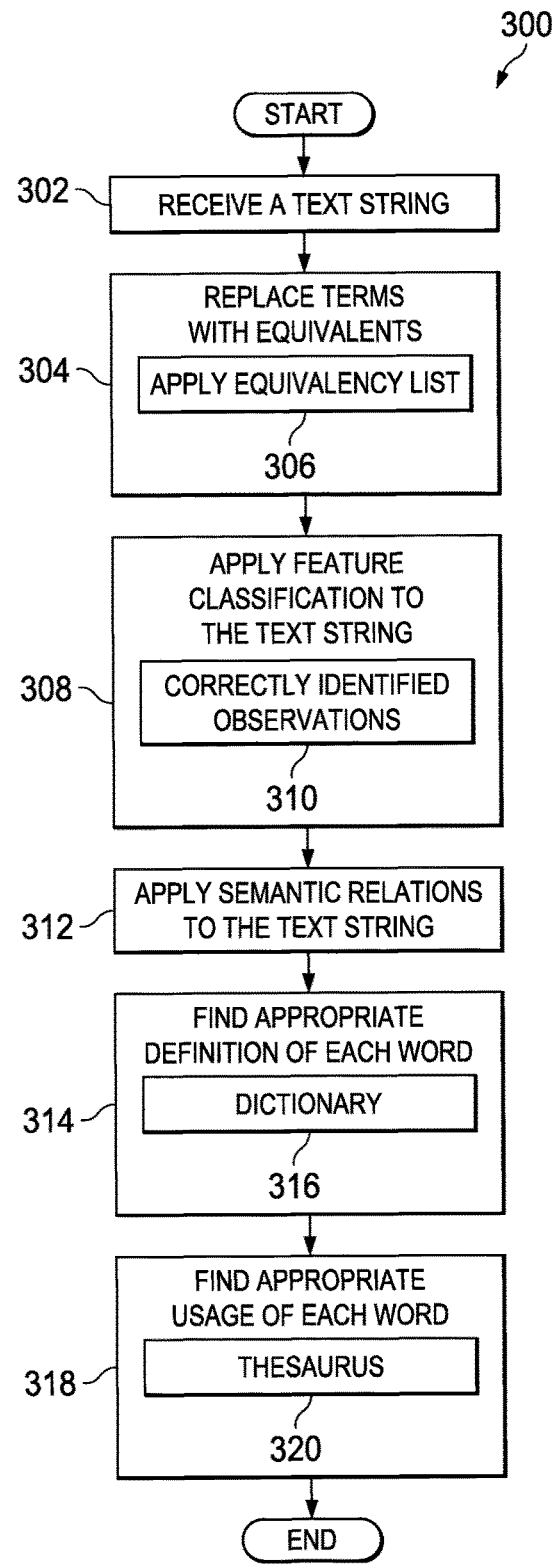
FIG. 3 is a flowchart of a process for disambiguation, in accordance with an illustrative embodiment.
Figure 4:
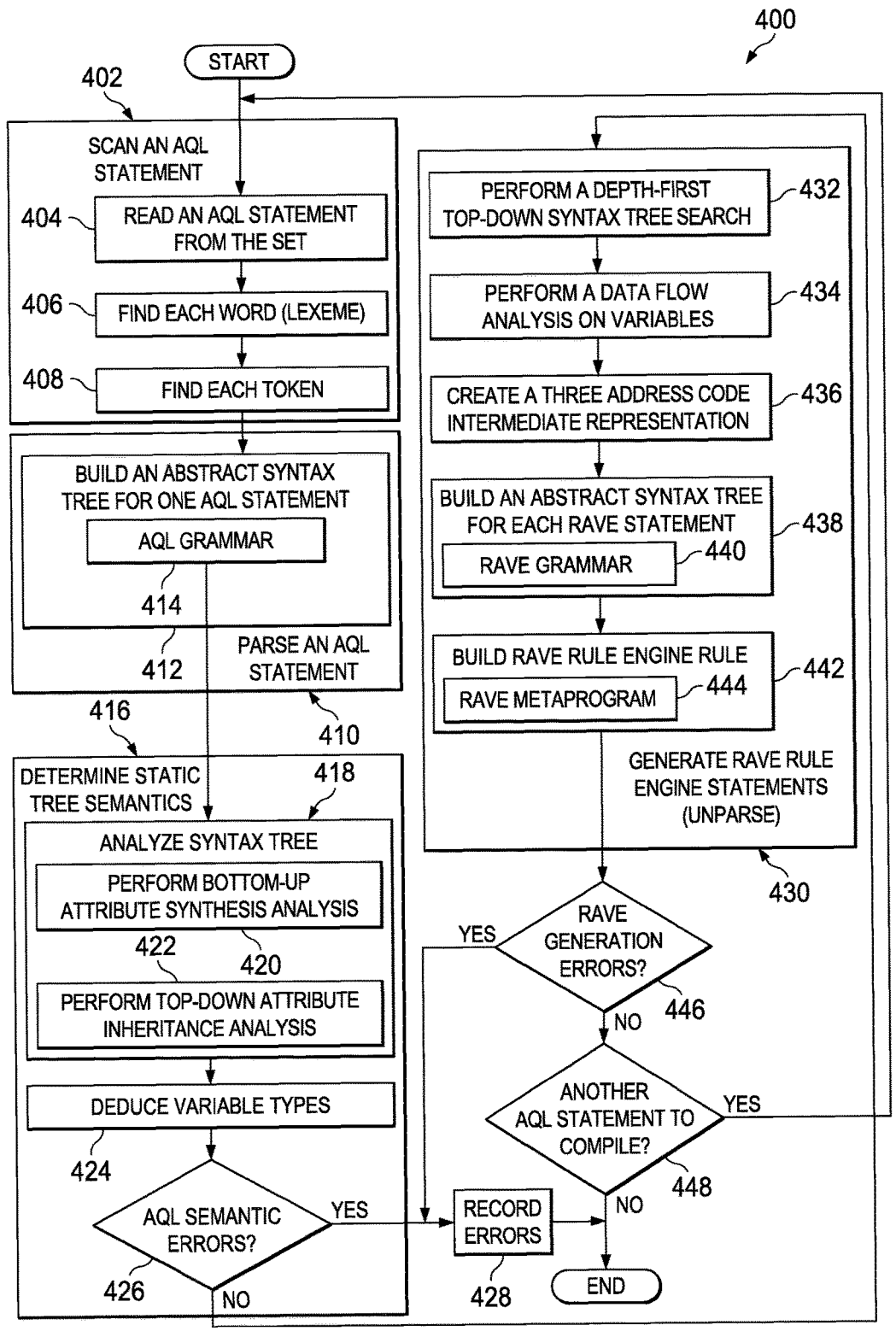
FIG. 4 is a flowchart of a process for compiling a structured language into rules engine rules, in accordance with an illustrative embodiment.
Figure 5:
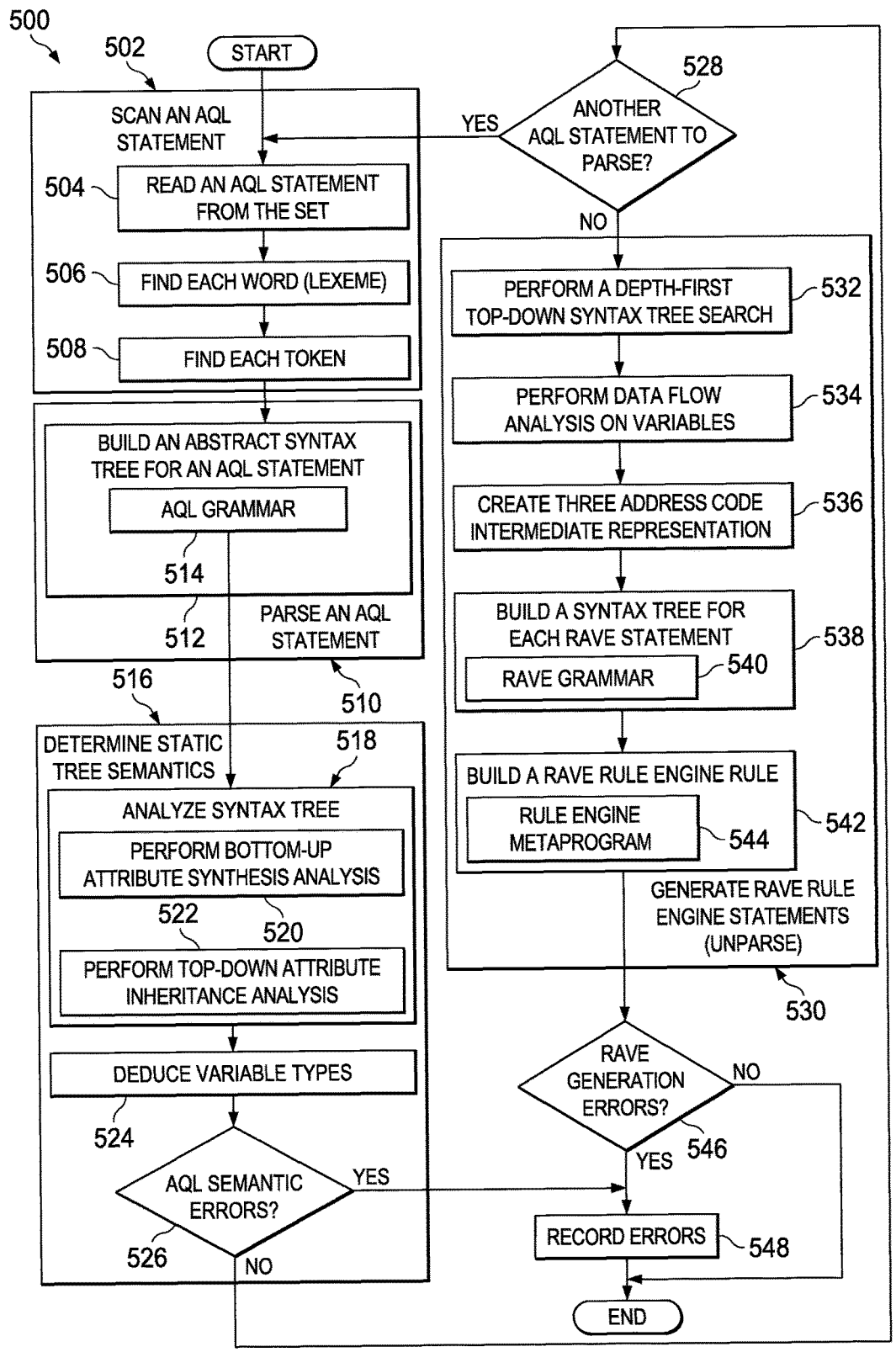
FIG. 5 is another flowchart of a process for compiling a structured language into rules engine rules, in accordance with an illustrative embodiment.

FIG. 1 represents an overview of a process of creating rules engine rules from unstructured text, in accordance with an illustrative embodiment. FIG. 2 through FIG. 4 represents some details of the processes shown in FIG. 1. FIG. 2 represents details of conversion of unstructured legality rules into a structured language which is more suitable for processing into rules for a rules engine. In most cases the unstructured text is taken from a plurality of disparate sources, perhaps a vast plurality of disparate sources (twenty or more). FIG. 3 represents some details of disambiguating text. FIG. 4 represents some details of compiling the structured language into rules engine rules suitable for use in a rules engine, specifically by compiling annotated query language (AQL) statements one at a time. FIG. 5 represents an alternative to FIG. 4. FIG. 5 represents some details of compiling the structured language into rules engine rules, specifically by analyzing all AQL statements at once.

FIG. 1 is a flowchart of a process for discovering, converting, compiling, and certifying rules, in accordance with an illustrative embodiment. Process 100 may be executed using a processor, such as processor unit 1104 of FIG. 11, using program code 1118 stored in a non-transitory computer readable storage medium, such as memory 1106, persistent storage 1108, or associative memory 1128 of FIG. 11. Thus, the various operations described in process 100 may be performed using processor unit 1104 of FIG. 11 or perhaps multiple processors.

Process 100 is a process for the discovery, conversion, compilation, and certification of a rules diagram. Process 100 may be an overview of the illustrative embodiments.

Process 100 begins by discovering legality text, represented by all of the different sub-boxes in box 102. The legality text may include text discovered from a plurality of different sources, including but not limited to regulatory authority pilot legality text 104, regulatory authority cabin crew legality text 106, pilot union legality text 108, cabin crew union legality text 110, airline customer pilot legality text 112, and customer cabin crew legality text 114. The sources of these text types may be from regulatory authorities, union contracts or agreements, and operator policies. The discovery of each of these text types may be a step in process 100, though these steps may be performed in parallel, in series, or a combination thereof. All of these types of text are unstructured text, usually natural language text.

After discovery, process 100 continues with converting a set of legality text into a structured language 116, such as but not limited to an AQL. That set of structured language then may be compiled into rule engine rules 118.

If the set of rule engine rules are from a regulatory authority 120 then the rule engine rules are certified 122 and user acceptance is tested 124. If the set of rule engine rules are not from a regulatory authority 120 then they are user acceptance tested 124.

If there is another set of legality text 126, then a set of legality text is converted into a structured language 116. That structured language is compiled into rule engine rules 118.

If the set of rule engine rules are from a regulatory authority 120 then the rule engine rules are certified 122 and user acceptance tested 124. If the set of rule engine rules are not from a regulatory authority 120 then they are user acceptance tested 124. If there is not another set of legality text 126 then the process ends.

The process shown in FIG. 1 may be varied. For example, the process may be applied outside of an airline operator context, such as a business enterprise, a research project, a game build, or any other process for converting unstructured text into rules engine rules. Thus, the illustrative embodiments described in FIG. 1 do not necessarily limit the claimed inventions.

FIG. 2 is a flowchart of a process for converting rules into a structured language, in accordance with an illustrative embodiment. Process 200 may be executed using a processor, such as processor unit 1104 of FIG. 11, using program code 1118 stored in a non-transitory computer readable storage medium, such as memory 1106, persistent storage 1108, or associative memory 1128 of FIG. 11. Thus, the various operations described in process 200 may be performed using processor unit 1104 of FIG. 11 or perhaps multiple processors.

Process 200 may be a process for converting pilot or cabin crew legality rules into a structured language. Process 200 may begin by receiving a raw set of legality text 202. A text statement is read from the raw set of legality text (operation 204) and disambiguated 206. If there is another text statement to convert at decision 208 then a text statement is read from operation 204 and disambiguated 206. If there is not another text statement to convert at decision 208 then text analytics is performed on the set of legality text 210 by applying a cognitive framework 212, applying key text patterns 214, applying term and phrase context 216, and applying association rules 218.

The set of fixed legality text statements is compiled into AQL statements 220. If the compilation is not successful 222 then each failing text statement is replaced with a user's interpretation 224. Any new equivalent terms are added to the equivalency list 226. Any new terms are added to the disambiguation dictionary 228. Any new synonyms are added to the disambiguation thesaurus 230.

A text statement is read from operation 204 and disambiguated 206. If there is another text statement to convert at decision 208 then a text statement is read from operation 204 and disambiguated 206. If there is not another text statement to convert at decision 208 then text analysis is performed on the set of legality text 210 by applying a cognitive framework 212, applying key text patterns 214, applying term and phrase context 216, and applying association rules 218. The set of fixed legality text statements is compiled into AQL statements 220. If the compilation is successful 222 then the process ends.

The process shown in FIG. 2 may be varied. For example, the process may be applied outside of an airline operator context, such as a business enterprise, a research project, a game build, or any other process for converting unstructured text into rules engine rules. Thus, the illustrative embodiments described in FIG. 2 do not necessarily limit the claimed inventions.

FIG. 3 is a flowchart of a process for disambiguation, in accordance with an illustrative embodiment. Process 300 may be executed using a processor, such as processor unit 1104 of FIG. 11, using program code 1118 stored in a non-transitory computer readable storage medium, such as memory 1106, persistent storage 1108, or associative memory 1128 of FIG. 11. Thus, the various operations described in process 300 may be performed using processor unit 1104 of FIG. 11 or perhaps multiple processors.

Process 300 is a process describing disambiguation of the unstructured text, or possibly of the structured language text. Process 300 may begin by receiving a text string (operation 302). Any equivalent terms are replaced (operation 304) by applying an equivalency list (operation 306). Feature classification is applied to the text string (operation 308) using correctly identified observations 310. Semantic relations are applied to the text string (operation 312). The appropriate definition of each word is found (operation 314) using dictionary 316. Appropriate usage of each word is found (operation 318) using thesaurus 320, then the process ends.

The process shown in FIG. 3 may be varied. For example, the process may be applied outside of an airline operator context, such as a business enterprise, a research project, a game build, or any other process for converting unstructured text into rules engine rules. Thus, the illustrative embodiments described in FIG. 3 do not necessarily limit the claimed inventions.

FIG. 4 is a flowchart of a process for compiling a structured language into rules engine rules, in accordance with an illustrative embodiment. Process 400 may be executed using a processor, such as processor unit 1104 of FIG. 11, using program code 1118 stored in a non-transitory computer readable storage medium, such as memory 1106, persistent storage 1108, or associative memory 1128 of FIG. 11. Thus, the various operations described in process 400 may be performed using processor unit 1104 of FIG. 11 or perhaps multiple processors.

Process 400 may be a process for compiling legality structured language statements into rule engine rules, by processing one structured language statement at a time. Process 400 may begin by scanning an AQL statement 402. Scanning an AQL statement may include reading an AQL statement from the set 404, finding each word (lexeme) 406, and finding each token 408.

The AQL statements are parsed 410. Parsing the AQL statements may include building an abstract syntax tree for one AQL statement 412 using AQL grammar 414. The static tree semantics are determined 416 by analyzing the syntax tree 418 and deducing variable types 424. Analyzing the syntax tree 418 may include performing attribute synthesis analysis bottom-up 420 and performing attribute inheritance analysis top-down 422.

If there are AQL semantic errors 426 then the errors are recorded 428 and the process ends. If there are no AQL semantic errors 426 then RAVE rule engine statements may be generated by unparsing 430. The RAVE rule engine is available from JEPPESEN, A BOEING COMPANY. Unparsing 430 may include performing a depth-first top-down syntax tree search 432, performing data flow analysis on variables 434, creating a three address code intermediate representation 436, building an abstract syntax tree for each RAVE statement 438 using RAVE grammar 440, and building a RAVE rule engine rule 442 using a RAVE metaprogram 444.

If there is a RAVE generation error 446, then the error is recorded 428 and the process ends. If there are no RAVE generation errors 446, then a determination is made if there is another AQL statement to compile 448.

If there is another AQL statement to compile 448, then the next AQL statement is scanned, which may include reading an AQL statement from the set 404, finding each word lexeme 406, and finding each token 408. The AQL statements are parsed 410, which may include building an abstract syntax tree for one AQL statement 412 using AQL grammar 414.

The static tree semantics may be determined 416 by analyzing the syntax tree 418 and deducing variable types 424. Analyzing the syntax tree 418 may include performing attribute synthesis analysis bottom-up 420 and performing attribute inheritance analysis top-down 422.

If there are AQL semantic errors 426, then the errors are recorded 428 and the process ends. If there are no AQL semantic errors 426, then RAVE rule engine statements are generated by unparsing 430. Unparsing may include performing a depth-first top-down syntax tree search 432, performing data flow analysis on variables 434, creating a three address code intermediate representation 436, building an abstract syntax tree for each RAVE statement 438 using RAVE grammar 440, building a RAVE rule engine rule 442 using a RAVE metaprogram 444.

If there is a RAVE generation error 446 then the errors are recorded 428 and the process ends. If there are no RAVE generation errors 446 then a determination is made if there is another AQL statement to compile 448. If there is not another AQL statement to compile 448 then the process ends.

The process shown in FIG. 4 may be varied. For example, the process may be applied outside of an airline operator context, such as a business enterprise, a research project, a game build, or any other process for converting unstructured text into rules engine rules. In another example, AQL statements are referenced; however, other structure language statements may be used, such as for example SQL statements. In still another example, the RAVE rules engine is referenced, though other rules engines could be used. Thus, the illustrative embodiments described in FIG. 4 do not necessarily limit the claimed inventions.

FIG. 5 is another flowchart of a process for compiling a structured language into rules engine rules, in accordance with an illustrative embodiment. Process 500 may be executed using a processor, such as processor unit 1104 of FIG. 11, using program code 1118 stored in a non-transitory computer readable storage medium, such as memory 1106, persistent storage 1108, or associative memory 1128 of FIG. 11. Thus, the various operations described in Process 500 may be performed using processor unit 1104 of FIG. 11 or perhaps multiple processors.

Process 500 may be a process for compiling a legality structured language into rule engine rules by analyzing all structured language statements together. FIG. 5 may be an alternative process for compiling a legality structured language into rules engine rules relative to FIG. 4.

Process 500 may begin by scanning an AQL statement 502. Scanning the AQL statement 502 may include reading an AQL statement from the set 504, finding each word (lexeme) 506, and finding each token 508.

The AQL statements are parsed 510. Parsing the AQL statements may include building an abstract syntax tree for one AQL statement 512 using AQL grammar 514. The static tree semantics may be determined 516 by analyzing the syntax tree 518 and deducing variable types 524. Analyzing the syntax tree 518 may include performing attribute synthesis analysis bottom-up 520 and performing attribute inheritance analysis top-down 522.

If there is an AQL semantic error 526 then the errors are recorded 548 and the process ends. If there are no AQL semantic errors 526 then a determination is made if there is another AQL statement to parse 528. If there is another AQL statement to parse 528, then another AQL statement is scanned. Scanning may include reading an AQL statement from the set 504, finding each word (lexeme) 506, and finding each token 508.

The AQL statements are parsed 510, which may include building an abstract syntax tree for an AQL statement 512 using AQL grammar 514. The static tree semantics are determined 516 by analyzing the syntax tree 518 and deducing variable types 524. Analyzing the syntax tree 518 may include performing attribute synthesis analysis bottom-up 520 and performing attribute inheritance analysis top-down 522.

If there is an AQL semantic error 526, then the errors are recorded and the process ends. If there are no AQL semantic errors 526 then a determination is made if there is another AQL statement to parse 528. If there is not another AQL statement to parse 528 then RAVE rule engine statements are generated by unparsing 530. Unparsing may include performing a depth-first, top-down syntax tree search 532, performing data flow analysis on variables 534, creating a three address code intermediate representation 536, building a syntax tree for each RAVE statement 538 using RAVE grammar 540, and building a RAVE rule engine rule 542 using a RAVE metaprogram 544. If there is a RAVE generation error 546 then the errors are recorded 548 and the process ends. If there are no RAVE generation errors 546 then the process ends.

The process shown in FIG. 5 may be varied. For example, the process may be applied outside of an airline operator context, such as a business enterprise, a research project, a game build, or any other process for converting unstructured text into rules engine rules. In another example, AQL statements are referenced; however, other structure language statements may be used, such as for example SQL statements. In still another example, the RAVE rules engine is referenced, though other rules engines could be used. Thus, the illustrative embodiments described in FIG. 5 do not necessarily limit the claimed inventions.

Figure 6:
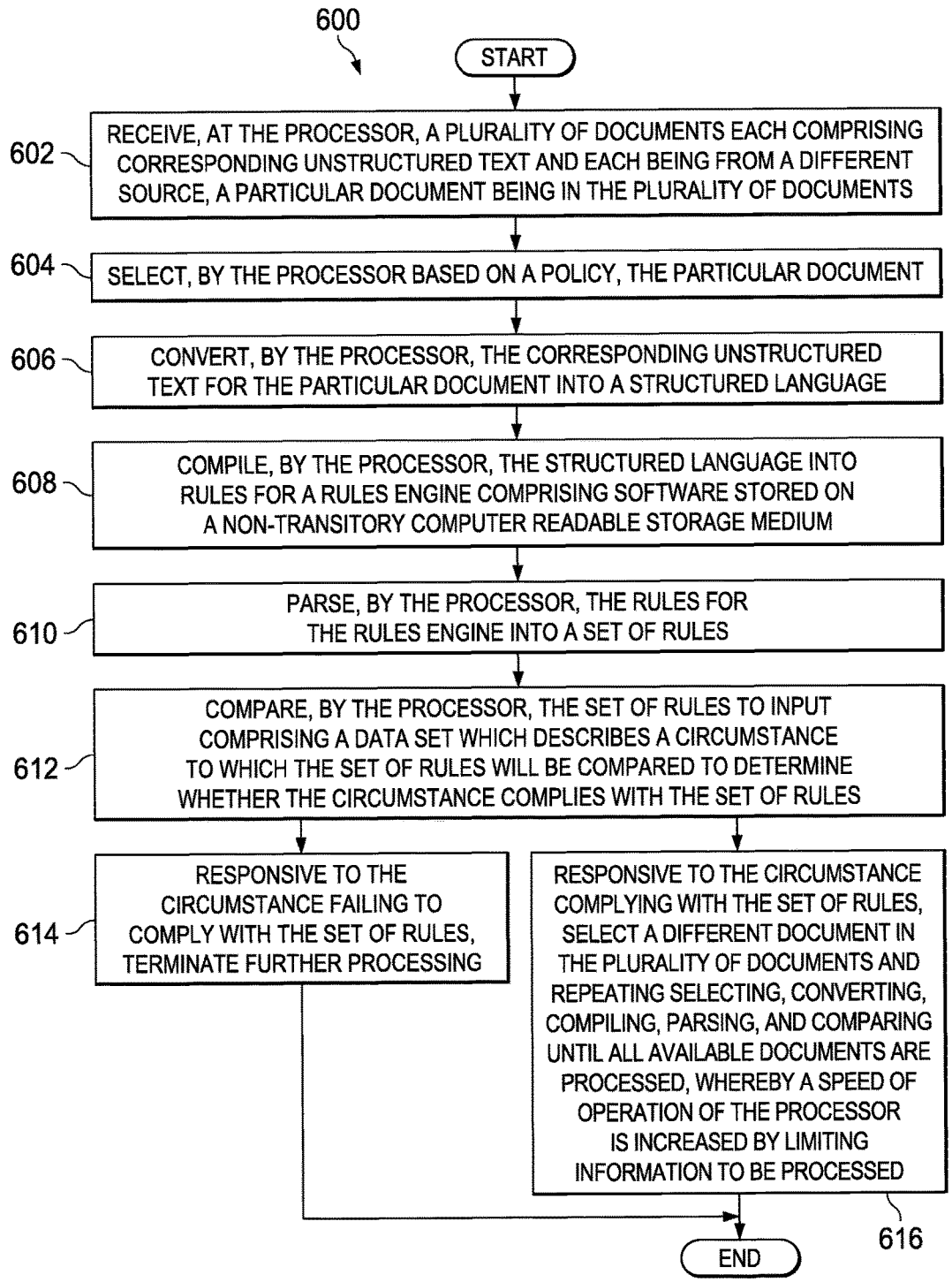
FIG. 6 is a flowchart of a process for increasing a speed of operation of a processor by limiting building and comparison of rules engine rules generated from unstructured text, in accordance with an illustrative embodiment.

FIG. 6 is a flowchart of a process for increasing a speed of operation of a processor by limiting building and comparison of rules engine rules generated from unstructured text, in accordance with an illustrative embodiment. Method 600 may be executed using a processor, such as processor unit 1104 of FIG. 11, using program code 1118 stored in a non-transitory computer readable storage medium, such as memory 1106, persistent storage 1108, or associative memory 1128 of FIG. 11. Thus, the various operations described in method 600 may be performed using processor unit 1104 of FIG. 11 or perhaps multiple processors. Method 600 should only be interpreted as a purely physical process.

Method 600 may be considered a method for increasing operational speed of a computer system including a processor. Method 600 may include receiving, at the processor, a plurality of documents each comprising corresponding unstructured text and each being from a different source, a particular document being in the plurality of documents (operation 602). Method 600 may also include selecting, by the processor based on a policy, the particular document (operation 604).

Method 600 may also include converting, by the processor, the corresponding unstructured text for the particular document into a structured language (operation 606). Method 600 may also include compiling, by the processor, the structured language into rules for a rules engine comprising software stored on a non-transitory computer readable storage medium (operation 608). Method 600 may also include parsing, by the processor, the rules for the rules engine into a set of rules (operation 610).

Method 600 may also include comparing, by the processor, the set of rules to input comprising a data set which describes a circumstance to which the set of rules will be compared to determine whether the circumstance complies with the set of rules (operation 612). Method 600 may also include, responsive to the circumstance failing to comply with the set of rules, terminating further processing (operation 614). Method 600 may also include, responsive to the circumstance complying with the set of rules, selecting a different document in the plurality of documents and repeating selecting, converting, compiling, parsing, and comparing until all available documents are processed, whereby a speed of operation of the processor is increased by limiting information to be processed (operation 616). Once all documents have been processed, or responsive to the circumstance failing to comply with any selected set of rules, the process may terminate thereafter.

The process described with respect to FIG. 6 may be varied. More or fewer operations may be present. For example, method 600 may also include, responsive to the circumstance failing to comply with the set of rules, reporting a reason why the circumstance fails to comply with the set of rules. In another example, the circumstance comprises a description of an aircraft and wherein the particular document comprises rules promulgated by a government authority, the rules describing requirements to be met before the aircraft is permitted to fly. In another example, the circumstance comprises a description of a crew for an aircraft and wherein the particular document comprises a union agreement that imposes limits or conditions on the crew.

In still another example, the circumstance comprises a description of an aircraft. In this case, the particular document comprises rules promulgated by a government authority. The rules describe requirements to be met before the aircraft is permitted to fly. In this case, the circumstance further comprises a description of a crew for an aircraft. The second document comprises a union agreement that imposes limits or conditions on the crew.

In still another example, the circumstance comprises a description of an aircraft. In this case, the particular document comprises first rules promulgated by a first government authority. The first rules describe first requirements to be met before the aircraft is permitted to fly. The second document comprises second rules promulgated by a second government authority. The second rules describe second requirements to be met before the aircraft is permitted to fly.

In another example, method 600 may also include disambiguating, as part of converting, the unstructured text; and forming, from resulting disambiguated text, annotation query language statements. In this case, parsing may include parsing the annotation query language statements. Further still, this method may include building an abstract syntax tree from the annotation query language statements; and determining static tree semantics by analyzing the syntax tree and deducing variable types. Still further, this method may be expanded in that analyzing comprises: performing a bottom-up attribute synthesis analysis; and performing top-down attribute inheritance analysis. This method may be expanded still further in that forming the set of rules may include performing a depth-first top-down search of the syntax tree; performing a data flow analysis on variables in the syntax tree; creating a three address code intermediate representation; building an abstract syntax tree for each rules engine statement using grammar specific to the rules engine grammar; and building a rules engine rule from the rules engine statement using a metaprogram.

The process shown in FIG. 6 may be varied. For example, the process may be applied outside of an airline operator context, such as a business enterprise, a research project, a game build, or any other process for converting unstructured text into rules engine rules. Thus, the illustrative embodiments described in FIG. 6 do not necessarily limit the claimed inventions.

Figures 7, 8:
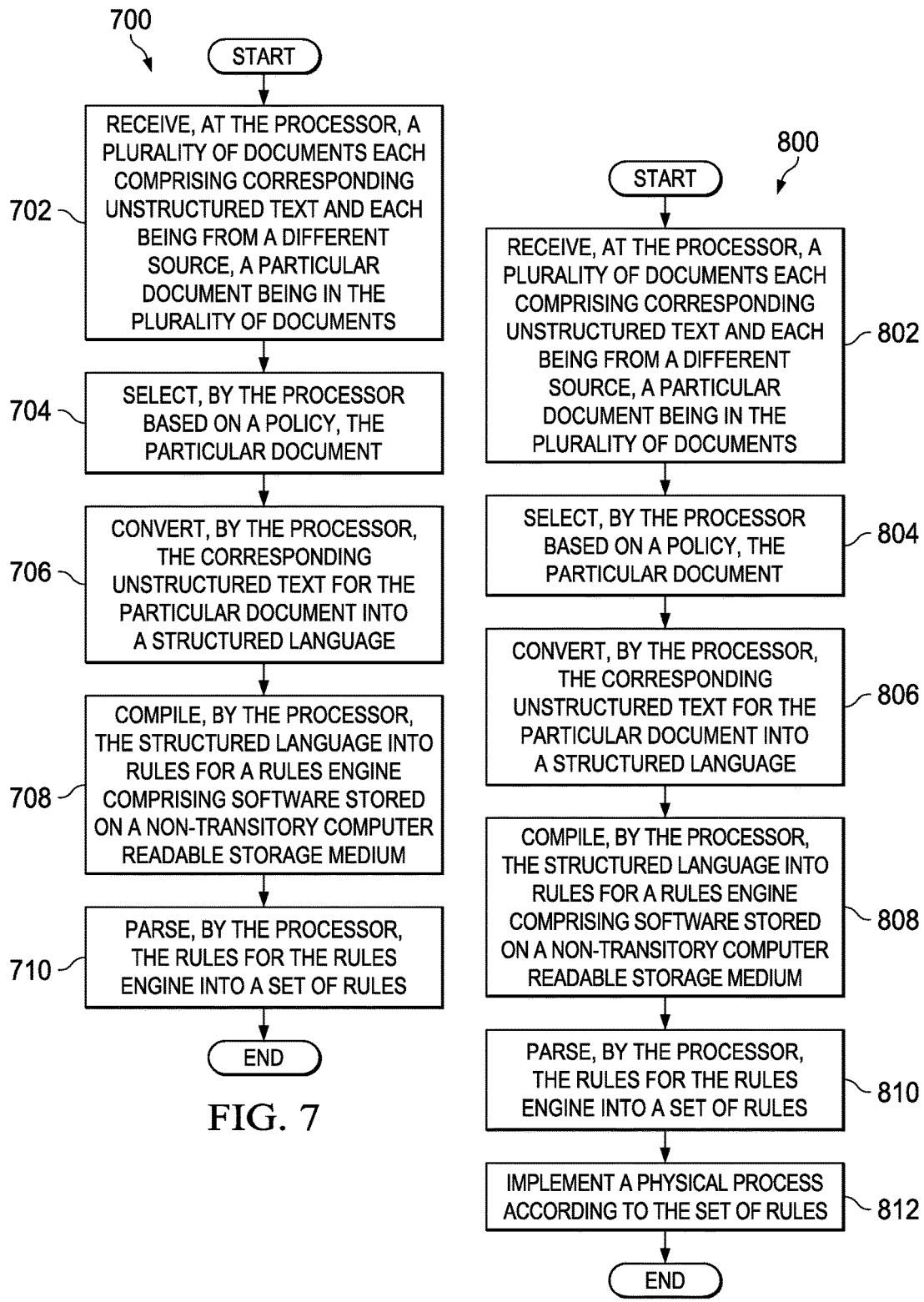
FIG. 7 is a flowchart of a process for manufacturing an aircraft, in accordance with an illustrative embodiment.
FIG. 8 is a flowchart for implementing a physical process, in accordance with an illustrative embodiment.

FIG. 7 is a flowchart of a process for manufacturing an aircraft, in accordance with an illustrative embodiment. Method 700 may be executed using a processor, such as processor unit 1104 of FIG. 11, using program code 1118 stored in a non-transitory computer readable storage medium, such as memory 1106, persistent storage 1108, or associative memory 1128 of FIG. 11. Thus, the various operations described in method 700 may be performed using processor unit 1104 of FIG. 11 or perhaps multiple processors. A robot directed by the processor unit may implement manufacturing of the aircraft. In other illustrative embodiments, a similar process may be used for performing maintenance on an aircraft. Other platforms, besides aircraft, are contemplated within the illustrative embodiments. Method 700 should only be interpreted as a purely physical process.

Method 700 may be a method of manufacturing an aircraft. Method 700 may include receiving, at the processor, a plurality of documents each comprising corresponding unstructured text and each being from a different source, a particular document being in the plurality of documents (operation 702). Method 700 may also include selecting, by the processor based on a policy, the particular document (operation 704).

Method 700 may also include converting, by the processor, the corresponding unstructured text for the particular document into a structured language (operation 706). Method 700 may also include compiling, by the processor, the structured language into rules for a rules engine comprising software stored on a non-transitory computer readable storage medium (operation 708).

Method 700 may also include parsing, by the processor, the rules for the rules engine into a set of rules (operation 710). Method 700 may also include constructing the aircraft according to the set of rules (operation 712).

Method 700 may be further varied. For example, the unstructured text may be a description of an aircraft and wherein the particular document comprises rules promulgated by a government authority. In this case, the rules describe requirements to be met before the aircraft is permitted to fly.

Method 700 may also include disambiguating, as part of converting, the unstructured text; and forming, from resulting disambiguated text, annotation query language statements. In this case, parsing may include parsing the annotation query language statements.

The process shown in FIG. 7 may be still further varied. For example, the process may be applied outside of an airline operator context, such as a business enterprise, a research project, a game build, or any other process for converting unstructured text into rules engine rules. Thus, the illustrative embodiments described in FIG. 7 do not necessarily limit the claimed inventions.

The process shown in FIG. 7 may be yet further varied. For example, the illustrative embodiments contemplate a rapid manufacturing aspect by increasing the speed of manufacturing by more quickly converting text requirements into rules for manufacturing. For example, multiple sets of unstructured text specification documents for part may be received, a subset selected by policy, and converted into a structured language specification for the part. The structured language part specification may then be compiled into computer-aided manufacturing instructions and parsed into a set of a set of instructions. The instructions are provided to either/both a three-dimensional printer and/or computer-guided manufacturing equipment. The printer and/or computer-guided manufacturing equipment then manufacture the part accordingly.

FIG. 8 is a flowchart for implementing a physical process, in accordance with an illustrative embodiment. Method 800 may be executed using a processor, such as processor unit 1104 of FIG. 11, using program code 1118 stored in a non-transitory computer readable storage medium, such as memory 1106, persistent storage 1108, or associative memory 1128 of FIG. 11. Thus, the various operations described in method 800 may be performed using processor unit 1104 of FIG. 11 or perhaps multiple processors. A robot directed by the processor unit may the physical process. Examples of physical process include, but are not limited to, manufacturing or performing maintenance on an aircraft or other platform or vehicle, manufacturing or performing maintenance on a building, manufacturing or performing maintenance on physical products, and/or verifying whether an aircraft or a crew for the aircraft satisfy rules and requirements. Method 800 should only be interpreted as a purely physical process.

Method 800 may be a method for implementing a physical process. Method 800 may include receiving, at the processor, a plurality of documents each comprising corresponding unstructured text and each being from a different source, a particular document being in the plurality of documents (operation 802). Method 800 may also include selecting, by processor based on a policy, the particular document (operation 804).

Method 800 may also include converting, by the processor, the corresponding unstructured text for the particular document into a structured language (operation 806). Method 800 may also include compiling, by the processor, the structured language into rules for a rules engine comprising software stored on a non-transitory computer readable storage medium (operation 808).

Method 800 may also include parsing, by the processor, the rules for the rules engine into a set of rules (operation 810). Method 800 may also include implementing a physical process according to the set of rules (operation 812).

Method 800 may be further varied. For example, the physical process may be checking whether a crew assigned to an aircraft is certified to operate the aircraft. Alternative, the physical process may be manufacturing an aircraft.

In another illustrative embodiment, method 800 may further include disambiguating, as part of converting, the unstructured text; and forming, from resulting disambiguated text, annotation query language statements. In this case, parsing may include parsing the annotation query language statements.

The process shown in FIG. 8 may be varied. For example, the process may be applied outside of an airline operator context, such as a business enterprise, a research project, a game build, or any other process for converting unstructured text into rules engine rules. Thus, the illustrative embodiments described in FIG. 8 do not necessarily limit the claimed inventions.

Figure 9:
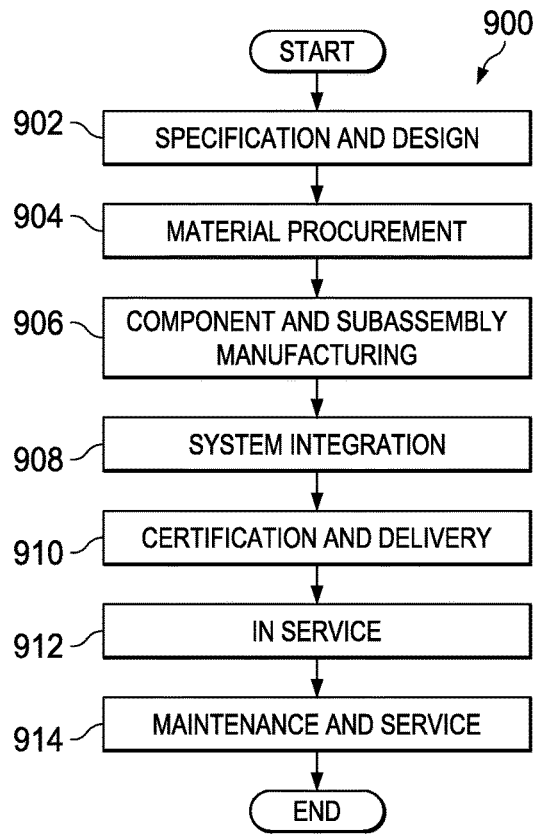
FIG. 9 is an aircraft manufacturing and service method, in accordance with an illustrative embodiment.
Figure 10:
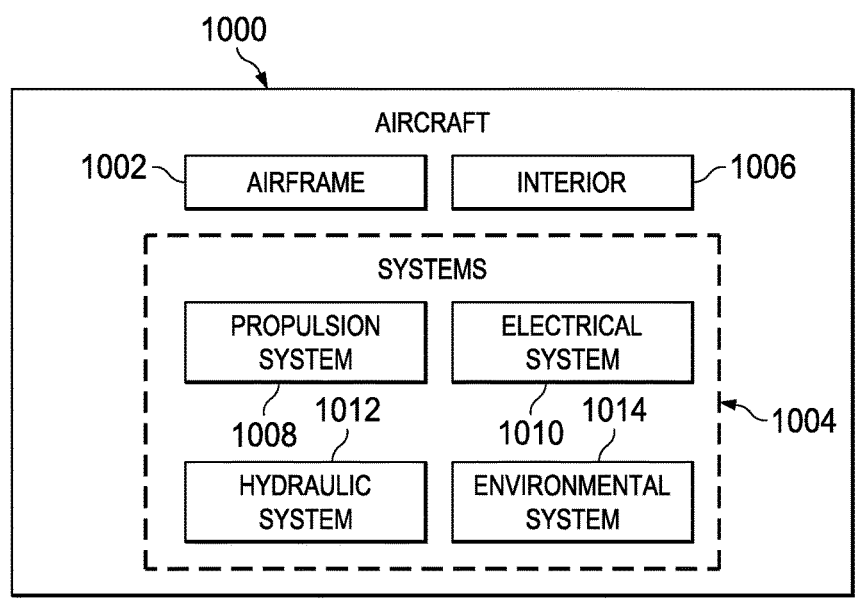
FIG. 10 is an aircraft, in accordance with an illustrative embodiment.

FIG. 9 is an aircraft manufacturing and service method, in accordance with an illustrative embodiment. FIG. 10 is an aircraft, in accordance with an illustrative embodiment. FIG. 9 and FIG. 10 should be read together. The illustrative embodiments described with respect to FIG. 1 through FIG. 8 may be used as part of method 900 of FIG. 9. Any of the operations 902, 904, 906, 908, 910, 912, and/or 914 could use the illustrative embodiments to ensure that performance or the result of these operations complies with rules stated originally in unstructured text. Likewise, the illustrative embodiments described with respect to FIG. 1 through FIG. 8 may be used with respect to ensuring that aircraft 1000 complies with rules stated originally in unstructured text.

Illustrative embodiments of the disclosure may be described in the context of aircraft manufacturing and service method 900 as shown in FIG. 9 and aircraft 1000 as shown in FIG. 10. Turning first to FIG. 9, an illustration of an aircraft manufacturing and service method is depicted in accordance with an illustrative embodiment. During pre-production, aircraft manufacturing and service method 900 may include specification and design 902 of aircraft 1000 in FIG. 10 and material procurement 904.

During production, component and subassembly manufacturing 906 and system integration 908 of aircraft 1000 in FIG. 10 takes place. Thereafter, aircraft 1000 in FIG. 10 may go through certification and delivery 910 in order to be placed in service 912. While in service 912 by a customer, aircraft 1000 in FIG. 10 is scheduled for routine maintenance and service 914, which may include modification, reconfiguration, refurbishment, and other maintenance or service.

Each of the processes of aircraft manufacturing and service method 900 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 10, an illustration of an aircraft is depicted in which an illustrative embodiment may be implemented. In this example, aircraft 1000 is produced by aircraft manufacturing and service method 900 in FIG. 9 and may include airframe 1002 with plurality of systems 1004 and interior 1006. Examples of systems 1004 include one or more of propulsion system 1008, electrical system 1010, hydraulic system 1012, and environmental system 1014. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 900 in FIG. 9.

In one illustrative example, components or subassemblies produced in component and subassembly manufacturing 906 in FIG. 9 may be fabricated or manufactured in a manner similar to components or subassemblies produced while aircraft 1000 is in service 912 in FIG. 9. As yet another example, one or more apparatus embodiments, method embodiments, or a combination thereof may be utilized during production stages, such as component and subassembly manufacturing 906 and system integration 908 in FIG. 9. One or more apparatus embodiments, method embodiments, or a combination thereof may be utilized while aircraft 1000 is in service 912 and/or during maintenance and service 914 in FIG. 9. The use of a number of the different illustrative embodiments may substantially expedite the assembly of and/or reduce the cost of aircraft 1000.

Figure 11:
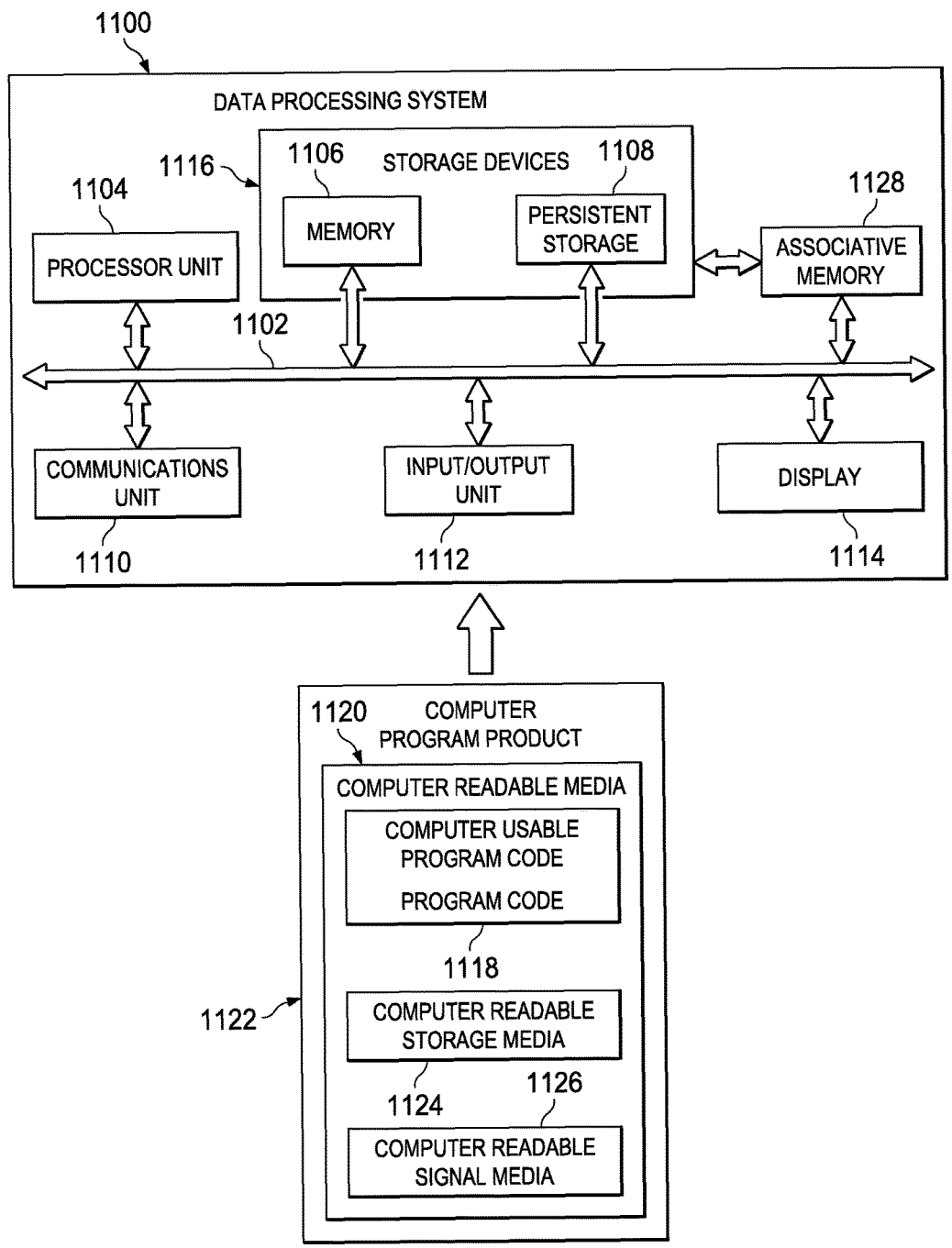
FIG. 11 illustrates a data processing system, in accordance with an illustrative embodiment.

Turning now to FIG. 11, an illustration of a data processing system is depicted in accordance with an illustrative embodiment. Data processing system 1100 in FIG. 11 is an example of a data processing system that may be used to implement the illustrative embodiments, such as the interpolation methods described with respect to FIG. 1 through FIG. 7, and FIG. 9. Data processing system 1100 may be used to instruct a robot to build or to perform maintenance on an aircraft, such as aircraft 1000 of FIG. 10.

In this illustrative example, data processing system 1100 includes communications fabric 1102, which provides communications between processor unit 1104, memory 1106, persistent storage 1108, communications unit 1110, input/output (I/O) unit 1112, display 1114 and associative memory 1128.

Processor unit 1104 serves to execute instructions for software that may be loaded into memory 1106. This software may be an associative memory, content addressable memory, or software for implementing the processes described elsewhere herein. Processor unit 1104 may be a number of processors, a multi-processor core, or some other type of processor, depending on the particular implementation. A number, as used herein with reference to an item, means one or more items. Further, processor unit 1104 may be implemented using a number of heterogeneous processor systems in which a main processor is present with secondary processors on a single chip. As another illustrative example, processor unit 1104 may be a symmetric multi-processor system containing multiple processors of the same type.

Memory 1106 and persistent storage 1108 are examples of storage devices 1116. A storage device is any piece of hardware that is capable of storing information, such as, for example, without limitation, data, program code 1118 in functional form, and/or other suitable information either on a temporary basis and/or a permanent basis. Storage devices 1116 may also be referred to as computer readable storage devices in these examples. Memory 1106, in these examples, may be, for example, a random access memory or any other suitable volatile or non-volatile storage device. Persistent storage 1108 may take various forms, depending on the particular implementation.

For example, persistent storage 1108 may contain one or more components or devices. For example, persistent storage 1108 may be a hard drive, a flash memory, a rewritable optical disk, a rewritable magnetic tape, or some combination of the above. The media used by persistent storage 1108 also may be removable. For example, a removable hard drive may be used for persistent storage 1108.

Communications unit 1110, in these examples, provides for communications with other data processing systems or devices. In these examples, communications unit 1110 is a network interface card. Communications unit 1110 may provide communications through the use of either or both physical and wireless communications links.

Input/output (I/O) unit 1112 allows for input and output of data with other devices that may be connected to data processing system 1100. For example, input/output (I/O) unit 1112 may provide a connection for user input through a keyboard, a mouse, and/or some other suitable input device. Further, input/output (I/O) unit 1112 may send output to a printer. Display 1114 provides a mechanism to display information to a user.

Instructions for the operating system, applications, and/or programs may be located in storage devices 1116, which are in communication with processor unit 1104 through communications fabric 1102. In these illustrative examples, the instructions are in a functional form on persistent storage 1108. These instructions may be loaded into memory 1106 for execution by processor unit 1104. The processes of the different embodiments may be performed by processor unit 1104 using computer implemented instructions, which may be located in a memory, such as memory 1106.

These instructions are referred to as program code 1118, but may be referred to as computer usable program code, or computer readable program code that may be read and executed by a processor in processor unit 1104. The program code 1118 in the different embodiments may be embodied on different physical or computer readable storage media, such as memory 1106 or persistent storage 1108.

Program code 1118 is located in a functional form on computer readable media 1120 that is selectively removable and may be loaded onto or transferred to data processing system 1100 for execution by processor unit 1104. Program code 1118 and computer readable media 1120 form computer program product 1122 in these examples. In one example, computer readable media 1120 may be computer readable storage media 1124 or computer readable signal media 1126. Computer readable storage media 1124 may include, for example, an optical or magnetic disk that is inserted or placed into a drive or other device that is part of persistent storage 1108 for transfer onto a storage device, such as a hard drive, that is part of persistent storage 1108. Computer readable storage media 1124 also may take the form of a persistent storage, such as a hard drive, a thumb drive, or a flash memory, that is connected to data processing system 1100. In some instances, computer readable storage media 1124 may not be removable from data processing system 1100.

Alternatively, program code 1118 may be transferred to data processing system 1100 using computer readable signal media 1126. Computer readable signal media 1126 may be, for example, a propagated data signal containing program code 1118. For example, computer readable signal media 1126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1118 may be downloaded over a network to persistent storage 1108 from another device or data processing system through computer readable signal media 1126 for use within data processing system 1100. For instance, program code 1118 stored in a computer readable storage medium in a server data processing system may be downloaded over a network from the server to data processing system 1100. The data processing system providing program code 1118 may be a server computer, a client computer, or some other device capable of storing and transmitting program code 1118.

The different components illustrated for data processing system 1100 are not meant to provide architectural limitations to the manner in which different embodiments may be implemented. The different illustrative embodiments may be implemented in a data processing system including components in addition to or in place of those illustrated for data processing system 1100. Other components shown in FIG. 11 can be varied from the illustrative examples shown. The different embodiments may be implemented using any hardware device or system capable of running program code 1118. As one example, the data processing system may include organic components integrated with inorganic components and/or may be comprised entirely of organic components excluding a human being. For example, a storage device may be comprised of an organic semiconductor.

In another illustrative example, processor unit 1104 may take the form of a hardware unit that has circuits that are manufactured or configured for a particular use. This type of hardware may perform operations without needing program code 1118 to be loaded into a memory from a storage device to be configured to perform the operations.

For example, when processor unit 1104 takes the form of a hardware unit, processor unit 1104 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 1118 may be omitted because the processes for the different embodiments are implemented in a hardware unit.

In still another illustrative example, processor unit 1104 may be implemented using a combination of processors found in computers and hardware units. Processor unit 1104 may have a number of hardware units and a number of processors that are configured to run program code 1118. With this depicted example, some of the processes may be implemented in the number of hardware units, while other processes may be implemented in the number of processors.

As another example, a storage device in data processing system 1100 is any hardware apparatus that may store data. Memory 1106, persistent storage 1108, and computer readable media 1120 are examples of storage devices in a tangible form.

In another example, a bus system may be used to implement communications fabric 1102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 1106, or a cache, such as found in an interface and memory controller hub that may be present in communications fabric 1102.

Data processing system 1100 may also include associative memory 1128. Associative memory 1128 may be in communication with communications fabric 1102. Associative memory 1128 may also be considered part of storage devices 1116. While one associative memory 1128 is shown, additional associative memories may be present.

As used herein, the term "associative memory" refers to a plurality of data and a plurality of associations among the plurality of data. The plurality of data and the plurality of associations may be stored in a non-transitory computer readable storage medium. The plurality of data may be collected into associated groups. The associative memory may be configured to be queried based on at least indirect relationships among the plurality of data in addition to direct correlations among the plurality of data. Thus, an associative memory may be configured to be queried based solely on direct relationships, based solely on indirect relationships, as well as based on combinations of direct and indirect relationships. An associative memory may be a content addressable memory.

Thus, an associative memory may be characterized as a plurality of data and a plurality of associations among the plurality of data. The plurality of data may be collected into associated groups. Further, the associative memory may be configured to be queried based on at least one relationship, selected from a group that includes direct and indirect relationships, or from among the plurality of data in addition to direct correlations among the plurality of data. An associative memory may also take the form of software. Thus, an associative memory also may be considered a process by which information is collected into associated groups in the interest of gaining new insight based on relationships rather than direct correlation. An associative memory may also take the form of hardware, such as specialized processors or a field programmable gate array.

As used herein, the term "entity" refers to an object that has a distinct, separate existence, though such existence need not be a material existence. Thus, abstractions and legal constructs may be regarded as entities. As used herein, an entity need not be animate. Associative memories work with entities.

The different illustrative embodiments can take the form of an entirely hardware embodiment, an entirely software embodiment, or an embodiment containing both hardware and software elements. Some embodiments are implemented in software, which includes but is not limited to forms such as, for example, firmware, resident software, and microcode.

Furthermore, the different embodiments can take the form of a computer program product accessible from a computer usable or computer readable medium providing program code 1118 for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non-limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W), and DVD.

Further, a computer usable or computer readable medium may contain or store a computer readable or program code 1118 such that when the computer readable or program code 1118 is executed on a computer, the execution of this computer readable or program code 1118 causes the computer to transmit another computer readable or program code 1118 over a communications link. This communications link may use a medium that is, for example without limitation, physical or wireless.

A data processing system suitable for storing and/or executing computer readable or program code 1118 will include one or more processors coupled directly or indirectly to memory elements through a communications fabric, such as a system bus. The memory elements may include local memory employed during actual execution of the program code 1118, bulk storage, and cache memories which provide temporary storage of at least some program code 1118 to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples of modems and network adapters are just a few of the currently available types of communications adapters.

Thus, the illustrative embodiments provide for techniques where ambiguous regulatory authority text is initially converted into a structured language to be the input to the rule engine compiler. Any semantic issues encountered during that conversion can be repaired by an in-house expert or, failing that, brought to the regulatory authority for resolution either implicitly by explanation or explicitly through formal rule changes.

The illustrative embodiments also provide for semi-automatic legality rule creation of rule engine rules from structured language sources. The illustrative embodiments result in better quality, more accurate rule engine rules.

The illustrative embodiments contemplate that a human subject matter expert may perform a quality check on the compiled rules, though such action is not needed for operation of the illustrative embodiments. Subject matter experts may have access to structured text instead of ambiguous regulatory authority text.

The illustrative embodiments contemplate that structured text conversion occurs only once, eliminating individual interpretation that occurs today. The illustrative embodiments contemplate that modular sets of rules allow for recompilation only of affected modules, not the whole set. In this manner, the rules generated by the illustrative embodiments are more complete and accurate. The process may be further improved by automated quality checks, such as a built-in defect feedback loop, thereby reducing or eliminating legality errors.

The illustrative embodiments may increase the addressable market place by an operator. Specifically, the barrier to entry into new commercial aviation markets with irregular crew legality rules is significantly lower because the effort to create the legality rules is reduced and the resulting quality is greater. This facet of the illustrative embodiments opens new markets to an operator or other business entity. Still further, the barrier to entry for new or adapted software products may be significantly lower for the same reasons as for commercial aviation.

The illustrative embodiments have other advantages. For example, rare and expensive skills required to create crew legality rules may be minimized through automation, lowering the required development funding and time. Additionally, union contract changes may be fully understood by the union and/or the operator prior to ratification. Further yet, during union negotiations, the full effect of contract changes to pilot or crew legality can be rigorously determined. This rapid prototyping and simulation of potential legality rule changes in relation to company and union legality rules cannot be provided with today's manual process.

The advantages of executing proposed contract changes against actual and proposed flight schedules include: Assessing financial impact of union rule changes, performing what-if analysis of alternative rule changes, examining conditions of union and company rule changes together, and incorrect, incompatible, inconsistent and incomplete contract provisions can be immediately identified and resolved before they become operational issues. Thus, the illustrative embodiments provide numerous advantages over the known art.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of manufacturing an aircraft comprising:
   receiving, at a processor, a plurality of documents each comprising corresponding unstructured text and each being from a different source, a particular document being in the plurality of documents;
   selecting, by the processor based on a policy, the particular document;
   converting, by the processor, the corresponding unstructured text for the particular document into a structured language;
   compiling, by the processor, the structured language into rules for a rules engine comprising software stored on a non-transitory computer readable storage medium;
   parsing, by the processor, the rules for the rules engine into a set of rules;
   comparing, by the processor, the set of rules to input comprising a data set which describes a circumstance;
   determining whether the circumstance complies with the set of rules;
   responsive to the circumstance failing to comply with the set of rules, terminating further processing;
   responsive to the circumstance complying with the set of rules, selecting a different document in the plurality of documents and repeating selecting, converting, compiling, parsing, and comparing until all available documents are processed, whereby a speed of operation of the processor is increased by limiting information to be processed; and
   constructing the aircraft according to the set of rules, wherein the circumstance comprises a description of the aircraft.

2. The method of claim 1, wherein the unstructured text comprises the description of the aircraft and wherein the particular document comprises rules promulgated by a government authority, the rules describing requirements to be met before the aircraft is permitted to fly.

3. The method of claim 1 further comprising:
   disambiguating, as part of converting, the unstructured text; and
   forming, from resulting disambiguated text, annotation query language statements.

4. The method of claim 3, wherein parsing comprises parsing the annotation query language statements.

5. A method for increasing operational speed of a computer system including a processor, the method comprising:
   receiving, at the processor, a plurality of documents each comprising corresponding unstructured text and each being from a different source, a particular document being in the plurality of documents;
   selecting, by the processor based on a policy, the particular document;
   converting, by the processor, the corresponding unstructured text for the particular document into a structured language;
   compiling, by the processor, the structured language into rules for a rules engine comprising software stored on a non-transitory computer readable storage medium;
   parsing, by the processor, the rules for the rules engine into a set of rules;
   comparing, by the processor, the set of rules to input comprising a data set which describes a circumstance to which the set of rules will be compared to determine whether the circumstance complies with the set of rules;
   responsive to the circumstance failing to comply with the set of rules, terminating further processing; and
   responsive to the circumstance complying with the set of rules, selecting a different document in the plurality of documents and repeating selecting, converting, compiling, parsing, and comparing until all available documents are processed, whereby a speed of operation of the processor is increased by limiting information to be processed,
   wherein the circumstance comprises a description of an aircraft.

6. The method of claim 5 further comprising:
   responsive to the circumstance failing to comply with the set of rules, reporting a reason why the circumstance fails to comply with the set of rules.

7. The method of claim 5, wherein the circumstance comprises a description of an aircraft and wherein the particular document comprises rules promulgated by a government authority, the rules describing requirements to be met before the aircraft is permitted to fly.

8. The method of claim 5, wherein the circumstance comprises a description of a crew for an aircraft and wherein the particular document comprises a union agreement that imposes limits or conditions on the crew.

9. The method of claim 5, wherein the circumstance comprises a description of an aircraft, wherein the particular document comprises rules promulgated by a government authority, the rules describing requirements to be met before the aircraft is permitted to fly, wherein the circumstance further comprises a description of a crew for an aircraft, and wherein the different document comprises a union agreement that imposes limits or conditions on the crew.

10. The method of claim 5, wherein the circumstance comprises a description of an aircraft, wherein the particular document comprises first rules promulgated by a first government authority, the first rules describing first requirements to be met before the aircraft is permitted to fly, wherein the different document comprises second rules promulgated by a second government authority, the second rules describing second requirements to be met before the aircraft is permitted to fly.

11. The method of claim 5 further comprising:
disambiguating, as part of converting, the unstructured text; and
forming, from resulting disambiguated text, annotation query language statements.

12. The method of claim 11 wherein parsing comprises parsing the annotation query language statements.

13. The method of claim 12 further comprising:
building an abstract syntax tree from the annotation query language statements; and
determining static tree semantics by analyzing a syntax tree and deducing variable types.

14. The method of claim 13, wherein analyzing comprises:
performing a bottom-up attribute synthesis analysis; and
performing top-down attribute inheritance analysis.

15. The method of claim 14, wherein forming the set of rules comprises:
performing a depth-first top-down search of the syntax tree;
performing a data flow analysis on variables in the syntax tree;
creating a three address code intermediate representation;
building an abstract syntax tree for one rules engine statement using grammar specific to rules engine grammar; and
building a rules engine rule from the rules engine statement using a metaprogram.

16. A method for implementing a physical process, the method comprising:
receiving, at a processor, a plurality of documents each comprising corresponding unstructured text and each being from a different source, a particular document being in the plurality of documents;
selecting, by the processor based on a policy, one of the plurality of documents;
converting, by the processor, the corresponding unstructured text for the particular document into a structured language;
compiling, by the processor, the structured language into rules for a rules engine comprising software stored on a non-transitory computer readable storage medium;
parsing, by the processor, the rules for the rules engine into a set of rules;
comparing, by the processor, the set of rules to input comprising a data set which describes a circumstance;
determining whether the circumstance complies with the set of rules;
responsive to the circumstance failing to comply with the set of rules, terminating further processing;
responsive to the circumstance complying with the set of rules, selecting a different document in the plurality of documents and repeating selecting, converting, compiling, parsing, and comparing until all available documents are processed, whereby a speed of operation of the processor is increased by limiting information to be processed; and
implementing a physical process according to the set of rules,
wherein the circumstance comprises a description of an aircraft and a description of a crew for the aircraft and the particular document comprises one of a description of the aircraft and a union agreement that imposes limitations or conditions on the crew.

17. The method of claim 16, wherein the physical process comprises checking whether the crew assigned to the aircraft is certified to operate the aircraft.

18. The method of claim 16, wherein the physical process comprises manufacturing the aircraft.

19. The method of claim 16 further comprising:
disambiguating, as part of converting, the unstructured text; and
forming, from resulting disambiguated text, annotation query language statements.

20. The method of claim 19, wherein parsing comprises parsing the annotation query language statements.

* * * * *